United States Patent [19]

Clayton et al.

[11] Patent Number: 5,025,444
[45] Date of Patent: Jun. 18, 1991

[54] COMMUNICATIONS ERROR DETECTION SYSTEM

[75] Inventors: James L. Clayton; Robert E. Gewin, both of Huntsville, Ala.

[73] Assignee: Phoenix Microsystems, Inc., Huntsville, Ala.

[21] Appl. No.: 334,587

[22] Filed: Apr. 5, 1989

[51] Int. Cl.⁵ .............................................. G06F 11/00
[52] U.S. Cl. ..................................... 371/34; 371/20.5
[58] Field of Search ................ 371/34, 32, 20.5, 20.4, 371/20.1, 20.6, 24, 71, 68.2, 67.1, 69.1; 370/13, 15; 375/10; 455/7, 9, 67; 340/825.06

[56] References Cited

U.S. PATENT DOCUMENTS

| 3,336,576 | 8/1967 | Sourgens | 371/34 |
| 3,344,353 | 9/1967 | Wilcox | 371/69.1 |
| 3,453,592 | 7/1969 | Yoshiteru | 371/34 |
| 4,070,648 | 1/1978 | Mergenthaler | 371/34 X |
| 4,347,609 | 8/1982 | Fukuyama | 371/34 |

Primary Examiner—Jerry Smith
Assistant Examiner—Robert W. Beausoliel
Attorney, Agent, or Firm—Phillips & Beumer

[57] ABSTRACT

A sample of a normal data communications stream producing an error is thereafter employed via a loop back arrangement as a test sample data stream for error detection.

3 Claims, 1 Drawing Sheet

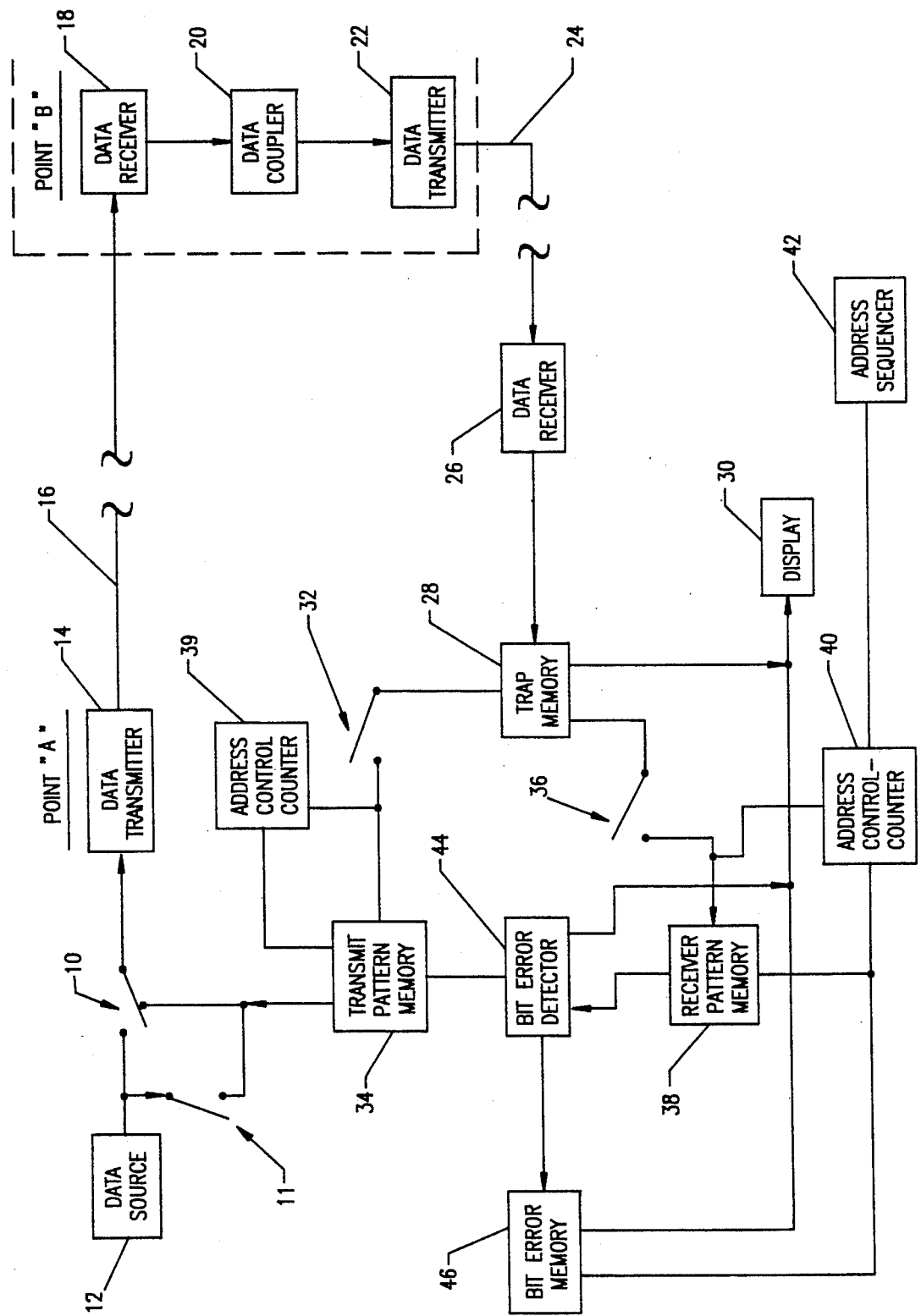

COMMUNICATIONS ERROR DETECTION SYSTEM

TECHNICAL FIELD

This invention relates generally to systems for analysis of the operation of data communications links and particularly to a system wherein an analysis is effected by the employment of actual communications data.

BACKGROUND OF THE INVENTION

It is well known that the accurate transmission and reception of binary based data imposes extreme requirements of accuracy. Where difficulties are experienced in, for example, a communications link, it is a common practice to use specially made up binary programs which have been found to provoke the occurrence of problems where such may occur occasionally. There are, however, instances where such programs fail to provoke the difficulty which has been experienced, making such problems extremely difficult to isolate.

Accordingly, it is an object of this invention to basically overcome this problem and to substantially improve the efficiency of fault detection.

SUMMARY OF THE INVENTION

In accordance with this invention, data is transmitted over a data link from point A to point B and then retransmitted from point B back to point A. Discrete lengths of the data as thus received back at point A is continuously trapped or buffered, and data abnormalities are thus made available for examination and detection. When an error or errors are noted in a selected sample of buffered data, it is recorded in a first or transmit pattern memory and is thereafter employed as transmitted data, this being transmitted from point A to point B and then retransmitted back to point A, this being repeated over and over for the sample. Upon receipt of the received data back at point A, it is placed in a received data memory, or received pattern memory. An output of it is then address adjusted to conform with the sequence of the data fed to the transmitter at point A. Thereafter, the outputs of the two memories are compared and differences, as error bits, detected.

BRIEF DESCRIPTION OF THE DRAWING

The single drawing is a diagrammatic illustration of an embodiment of the invention.

DETAILED DESCRIPTION OF THE DRAWING

Referring to the drawing, it will be assumed that selector switch 10 is in the upper position wherein, in normal course, data from data source 12 is supplied to data transmitter 14 and transmitted over a transmission line 16 from a point A location to a point B location, and at point B a conventional data receiver 18 receives the transmission. The output of receiver 18 is coupled via data coupler 20, which may include a memory for delayed transfer, to data transmitter 22 which then loops back or retransmits the received data, retransmission being over transmission line 24 back to data receiver 26 (or over the same transmission line when delayed or multiplexed) at the point A location. The data output of receiver 26 is supplied to receiver buffer or trap memory 28, and it is adapted to buffer or store a stream of data of a discrete length, for example, 100 to 4,000 binary bits. During this operation, switch 11 would be closed and switch 32 open. Transmit pattern memory 34 would thus receive the raw data and function to pass to one input of bit error detector 44 a reference signal for error detection. At the same time, with switch 36 closed, received data from trap memory 28 would be passed through to receive pattern memory 38. With address countercontrol 40 under the control of address sequencer 42 would arrange the data sequence in receiver pattern memory 38 to correspond with the order of data supplied by transmit pattern memory 34 to bit error detector 44. Bit errors would be detected by bit error detector 44 and supplied to bit error memory 46 which, under the control of address control 40, would identify the error bit positions which would then be made available to display 30, enabling readout of errors. Alternately, display 30 may directly read out the output of trap memory 28 and display data sequences in trap memory 28.

When data abnormalities are detected by a comparison of transmitted and received data from data source 12, switch 32 would be closed, and the content of memory 28 would be read into transmit pattern memory 34 under the control of address control 39. Next, switch 10 would be positioned in its lower position and switch 11 opened, whereby the data sequence now stored in transmit pattern memory 34 is supplied to transmitter 14 and transmitted over link 16 to receiver 18. Then, in accordance with the system thus far described, the sequence would be coupled by data coupler 20 to transmitter 22 and retransmitted back to receiver 26. Received data would be supplied to receiver trap memory 28, and then with selector switch 36 closed and switch 32 open, the data sequence would be supplied from memory 28 to receiver pattern memory 38 under the control of address control 40.

Address countercontrol 39 is set to read out the output of transmit pattern memory 34 repeatedly, and thus receiver pattern memory 38 repeatedly receives the retransmitted sequence. Address countercontrol 40 and/or countercontrol 39 would be conventionally manipulated by address sequencer 42 to effect readout of memory 38 in synchronization with the readout of transmit pattern memory 34. Both memories are then read out in synchronization to bit error detector 44 which, conventionally, effects a comparison between the instantaneous bits, now synchronized samples; and when a bit difference is detected, such is supplied to bit error memory 46 which is similarly controlled by an address control as, for example, address control 40 such that the location of a particular bit error could be traced to a particular point in the data sample. The outputs of bit error memory 46 and bit error detector 44 are available for appropriate display in display 30.

By the system thus described, it has been found that error occurrences can be provoked arising from normal data communications which for some reason are not provoked by standard test data patterns, and therefrom a system analysis made and system problems corrected in a much more expeditious manner.

It is to be appreciated that the basic and known functions of conventional hardware items are referred to and that the switching and other control functions as, for example, referred to by the switches, are intended to illustrate the functional relationship between the subsystems of the embodiment and not to necessarily represent specific circuit operations as between the individual functional block shown. The invention is, of course, in the combination of the blocks functionally illustrated and described, each in itself being conventional.

We claim:

1. A communications error detection system comprising:

a first data transmitter, at point A, and a second data transmitter, at point B, said first transmitter transmitting a data stream from said first data transmitter to said second data transmitter, and said second data transmitter transmitting a data stream to said first data transmitter;

a first data receiver at point A being coupled to receive a data stream from said second data transmitter, and a second data receiver at point B being coupled to receive a data stream from said first data transmitter;

retransmit coupling means for coupling the output of said second receiver to said second transmitter, whereby an output of said first transmitter is receiver by said second receiver and transmitted back to said first receiver;

sampling means coupled to said first receiver for sampling a selected sample data stream received by said first receiver;

transmitter coupling means including first memory means for storing a said selected sample data stream from said sampling means and selectively applying, as an output, the contents of said first memory means to said first data transmitter, whereby said sample data stream is repeatedly transmitted by said first transmitter;

second memory means responsive to the reception by said first receiver of sample data streams responsive to transmissions of said sample data stream to and from said second transmitter for providing as an output repeated sequences of data in the same sequence format as provided by the output of said first memory means; and comparator means coupled to said first and second memory means for providing bit-by-bit differences with respect to bit accuracy in the contents of said first and second memories and thereby providing transmission system influenced errors.

2. A system as set forth in claim 1 further comprising third memory means responsive to said comparator for registering bit errors.

3. A system as set forth in claim 2 further comprising display means responsive to said third memory means for displaying bit errors.

* * * * *